US012753699B1

(12) United States Patent
Greene

(10) Patent No.: US 12,753,699 B1
(45) Date of Patent: Oct. 6, 2026

(54) AIRFOIL HAVING FLEX ELEMENTS WITH COMPLIANCE STRUCTURE

(71) Applicant: GE Vernova Infrastructure Technology LLC, Greenville, SC (US)

(72) Inventor: John E. Greene, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/194,561

(22) Filed: Apr. 30, 2025

(51) Int. Cl.
*F01D 5/18* (2006.01)

(52) U.S. Cl.
CPC ........ *F01D 5/187* (2013.01); *F05D 2220/321* (2013.01); *F05D 2260/201* (2013.01); *F05D 2300/501* (2013.01)

(58) Field of Classification Search
CPC ........... F01D 5/187; F01D 5/188; F01D 5/189
See application file for complete search history.

(56) References Cited

U.S. PATENT DOCUMENTS 5,259,730 A * 11/1993 Damlis ................... F01D 5/189 416/96 A
7,219,498 B2 5/2007 Hadder
8,303,253 B1 * 11/2012 Liang ...................... F01D 5/189 415/115
8,714,911 B2 5/2014 Giri et al.
9,518,738 B2 12/2016 Gerendas
11,131,199 B2 9/2021 Romanov
2002/0062945 A1 5/2002 Hocker et al.
2005/0084370 A1 * 4/2005 Gross ...................... F01D 5/187 416/95
2010/0166565 A1 * 7/2010 Uskert ...................... F01D 5/10 416/241 B
2014/0286762 A1 * 9/2014 Kerber .................... F01D 5/188 415/175
2017/0030202 A1 * 2/2017 Itzel ........................ F01D 25/12
2017/0292407 A1 10/2017 Moga
2018/0179905 A1 6/2018 Fox et al.
2022/0127963 A1 * 4/2022 Lee ........................... F01D 5/18
(Continued)

FOREIGN PATENT DOCUMENTS

EP 3064712 A1 * 9/2016 ............. F01D 25/12
FR 3136012 A1 * 12/2023 ............... F01D 5/18
GB 723392 A * 2/1955 ............. F01D 5/189
(Continued)

*Primary Examiner* — Ryan C Clark
(74) *Attorney, Agent, or Firm* — Dority & Manning, P.A.

(57) ABSTRACT

An airfoil includes an airfoil body having a leading edge, a trailing edge, a suction side extending between the leading edge and the trailing edge, and a pressure side extending between the leading edge and the trailing edge. The airfoil body defines a chamber. The airfoil further includes an impingement cooling structure that is positioned within the chamber. The impingement cooling structure includes an impingement wall spaced apart from the airfoil body such that a post-impingement cavity is defined between the impingement wall and the airfoil body. The impingement cooling structure further includes a plurality of flex elements that extend from the impingement wall. Two or more flex elements are joined together at a junction. The impingement cooling structure further includes a compliance structure that is positioned at the junction and extends from to the two or more flex elements.

19 Claims, 7 Drawing Sheets

(56) References Cited

U.S. PATENT DOCUMENTS

| | | | | |
|---|---|---|---|---|
| 2023/0141827 | A1* | 5/2023 | Barker | F01D 5/189<br>415/115 |

FOREIGN PATENT DOCUMENTS

| | | | | | |
|---|---|---|---|---|---|
| GB | 2572793 | A | * | 10/2019 | F01D 5/189 |
| JP | 2000145403 | A | * | 5/2000 | F01D 5/189 |
| KR | 20220074692 | A | * | 6/2022 | F01D 5/187 |
| WO | WO-03062607 | A1 | * | 7/2003 | F01D 5/189 |
| WO | WO-2024097458 | A1 | * | 5/2024 | F01D 5/18 |

* cited by examiner

AIRFOIL HAVING FLEX ELEMENTS WITH COMPLIANCE STRUCTURE

FIELD

The present disclosure relates generally to an airfoil for a turbine rotor blade or stationary nozzle having flex elements with a compliance structure.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the gas turbine via the exhaust section.

During operation of the turbomachine, various hot gas path components in the system are subjected to high temperature flows, which can cause the hot gas path components to fail. Since higher temperature flows generally result in increased performance, efficiency, and power output of the turbomachine, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of turbine rotor blades and stationary nozzles often require complex cooling schemes in which air, typically bleed air from the compressor section, is forced through internal cooling passages within the airfoil and then discharged through cooling holes at the airfoil surface to transfer heat from the hot gas path component.

Many complex cooling schemes use small cooling passages, or micro-channels, to deliver cooling fluid through the airfoil. Such cooling schemes present a considerable fabrication challenge for cores and castings, which can significantly increase the manufacturing cost of the hot gas path components using such known near wall cooling systems. To address the fabrication challenges with complex and/or small cooling channels near the component surface, many hot gas path components with such features may be additively manufactured. Additive manufacturing is capable of producing components with intricate and varied cooling features.

However, when the hot gas path component is formed by additive manufacturing, the airfoil body and the impingement insert are a single piece that is exposed to the hot gas path temperatures. As such, mitigating thermally driven low cycle fatigue (LCF) in such hot gas path components presents a challenge.

Accordingly, an improved hot gas path component having one or more features that improve strain relief, LCF, and is capable of being additively manufactured is desired and would be advantageous in the art.

BRIEF DESCRIPTION

Aspects and advantages of the airfoils and turbine sections in accordance with the present disclosure will be set forth in part in the following description, or may be obvious from the description, or may be learned through practice of the technology.

In accordance with one embodiment, an airfoil is provided. The airfoil includes an airfoil body having a leading edge, a trailing edge, a suction side extending between the leading edge and the trailing edge, and a pressure side extending between the leading edge and the trailing edge. The airfoil body defines a chamber. The airfoil further includes an impingement cooling structure that is positioned within the chamber. The impingement cooling structure includes an impingement wall spaced apart from the airfoil body such that a post-impingement cavity is defined between the impingement wall and the airfoil body. The impingement cooling structure further includes a plurality of flex elements that extend from the impingement wall. Two or more flex elements are joined together at a junction. The impingement cooling structure further includes a compliance structure that is positioned at the junction and extends from to the two or more flex elements.

In accordance with another embodiment, a turbine section is provided. The turbine section includes rotor blades and stationary nozzles. One of the rotor blades or the stationary nozzles includes an airfoil. The airfoil includes an airfoil body having a leading edge, a trailing edge, a suction side extending between the leading edge and the trailing edge, and a pressure side extending between the leading edge and the trailing edge. The airfoil body defines a chamber. The airfoil further includes an impingement cooling structure that is positioned within the chamber. The impingement cooling structure includes an impingement wall spaced apart from the airfoil body such that a post-impingement cavity is defined between the impingement wall and the airfoil body. The impingement cooling structure further includes a plurality of flex elements that extend from the impingement wall. Two or more flex elements are joined together at a junction. The impingement cooling structure further includes a compliance structure that is positioned at the junction and extends from to the two or more flex elements.

These and other features, aspects and advantages of the present airfoils and turbine sections will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present airfoils and turbine sections, including the best mode of making and using the present systems and methods, directed to one of ordinary skill in the art, is set forth in the specification, which makes reference to the appended figures, in which.

DETAILED DESCRIPTION

Figure 1:
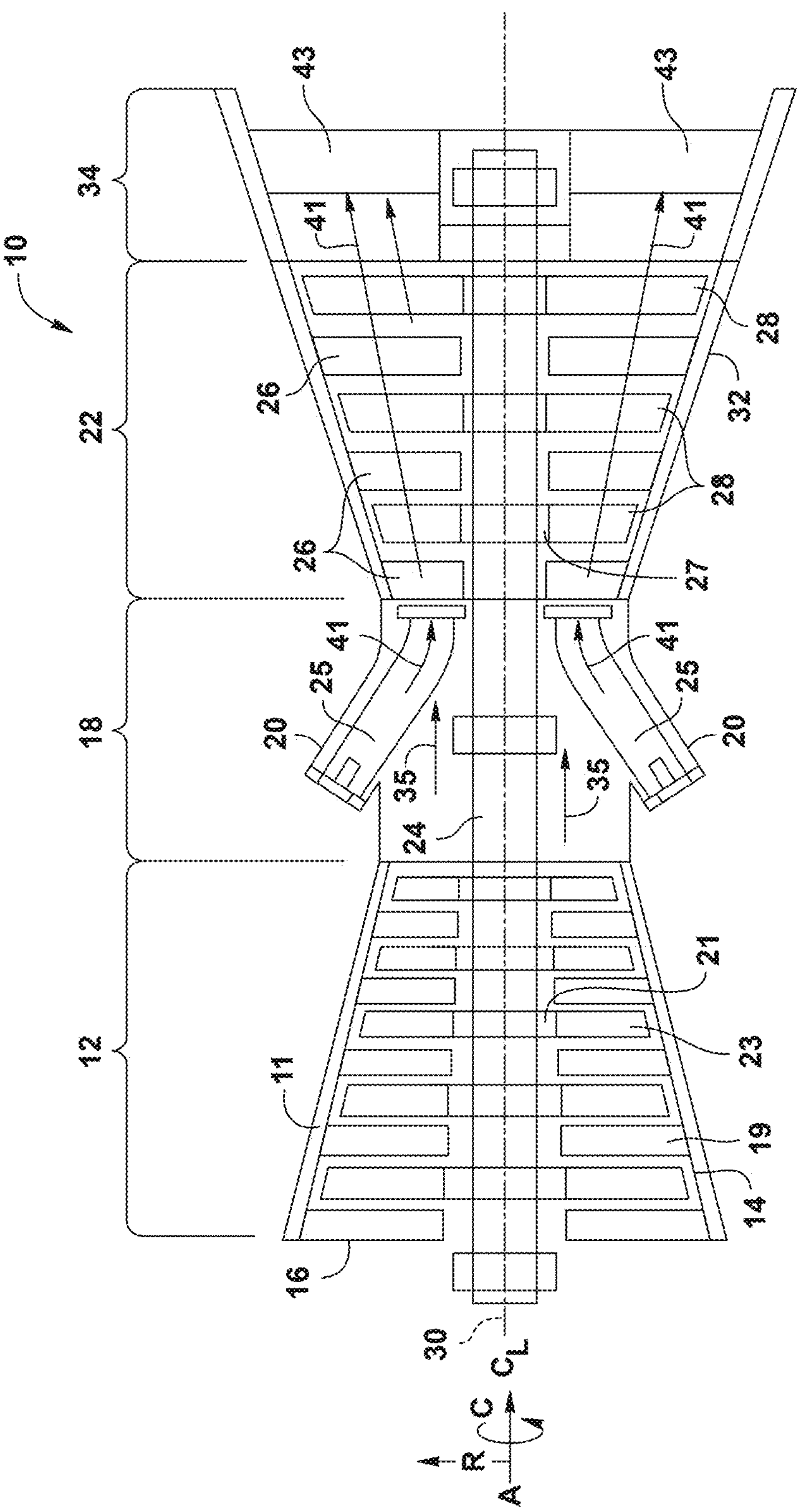
FIG. 1 is a schematic illustration of a turbomachine in accordance with embodiments of the present disclosure.

Reference now will be made in detail to embodiments of the present airfoils and turbine sections, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine engine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine engine 10 generally includes a compressor section 12. The compressor section 12 includes a compressor 14. The compressor section 12 includes an inlet 16 that is disposed at an upstream end of the gas turbine 10. The gas turbine 10 further includes a combustion section 18 having one or more combustors 20 disposed downstream from the compressor section 12. The gas turbine 10 further includes a turbine section 22 (i.e., an expansion turbine) that is downstream from the combustion section 18. A shaft 24 extends generally axially through the gas turbine engine 10 and couples the compressor section 12 and the turbine section 22.

The compressor section 12 may generally include a plurality of rotor disks 21 and a plurality of rotor blades 23 extending radially outwardly from and connected to each rotor disk 21. Each rotor disk 21 in turn may be coupled to or form a forward portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, the compressor section 12 includes stator vanes 19 disposed between the rotor blades 23. The stator vanes 19 may extend from and couple to a compressor casing 11.

The turbine section 22 may generally include a plurality of rotor disks 27 and a plurality of rotor blades 28 extending radially outwardly from and being interconnected to each rotor disk 27. Each rotor disk 27 in turn may be coupled to or form an aft portion of the shaft 24 that extends through the turbine section 22. The turbine section 22 further includes an outer casing 32 that circumferentially surrounds the aft portion of the shaft 24 and the rotor blades 28. The turbine section 22 may include stator vanes or stationary nozzles 26 extending radially inward from the outer casing 32. The rotor blades 28 and stator vanes 26 may be arranged in alternating fashion in stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air or other working fluid is drawn into the inlet 16 of the compressor 14 and is progressively compressed to provide a compressed air 35 to the combustion section 18. The compressed air 35 flows into the combustion section 18 and is mixed with fuel to form a combustible mixture. The combustible mixture is burned within a combustion chamber 25 of the combustor 20, thereby generating combustion gases 41 that flow from the combustion chamber 25 into the turbine section 22. Energy (kinetic and/or thermal) is transferred from the combustion gases 41 to the rotor blades 28, causing the shaft 24 to rotate and produce mechanical work. The spent combustion gases 41 (also called "exhaust gases") exit the turbine section 22 and flow through the exhaust diffuser 34 across a plurality of struts or main airfoils 43 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
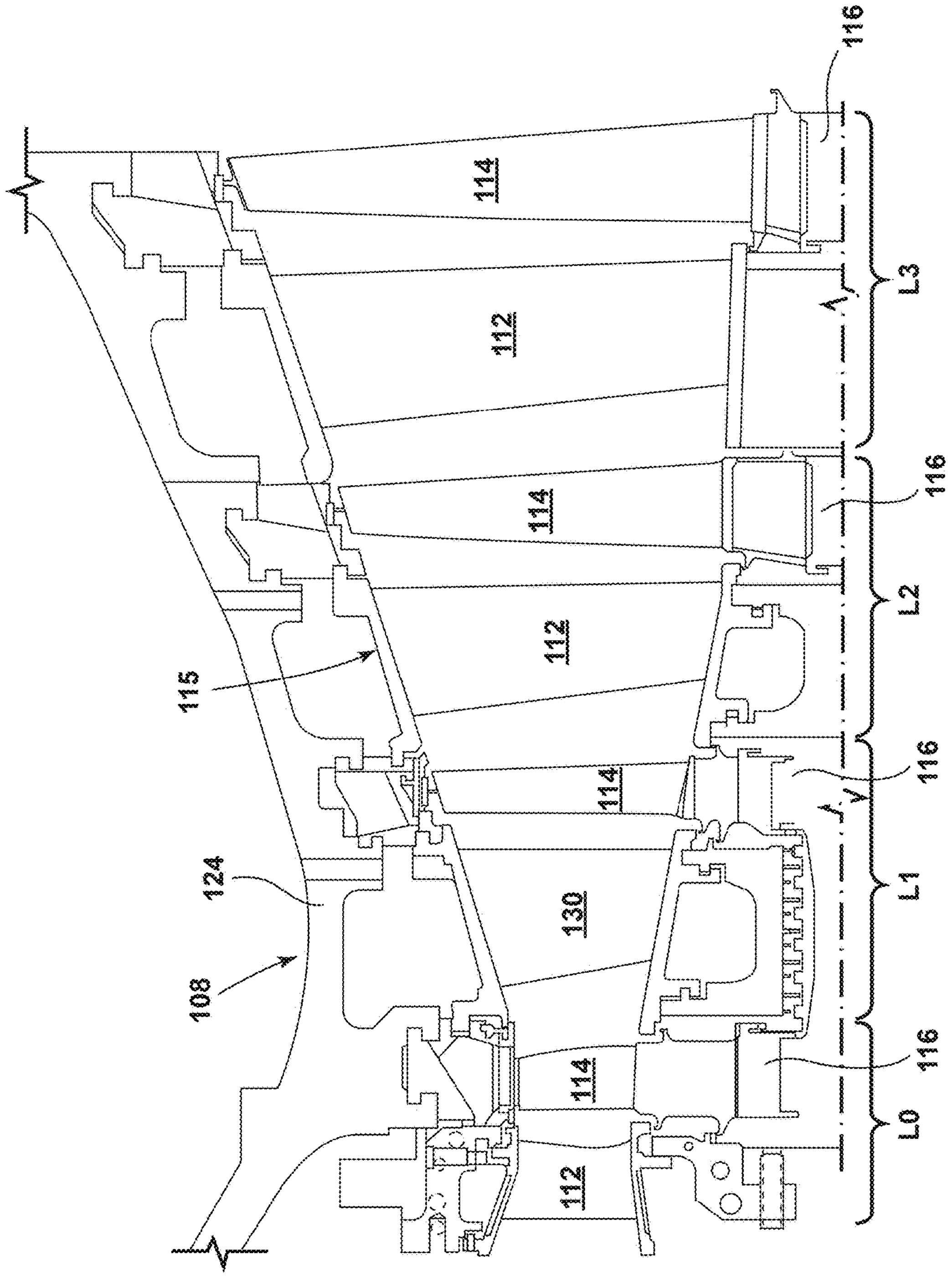
FIG. 2 illustrates a cross-sectional view of a portion of a turbine section of a turbomachine in accordance with embodiments of the disclosure.

Referring now to FIG. 2, a cross-sectional view of a portion of a turbine section 22 is illustrated in. In the example shown, turbine section 22 includes four stages L0-L3 that may be used with the gas turbine 10 described above with reference to FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine section 22 and to define a portion of a working fluid path through turbine section 22. Blades 114 in each stage are coupled to shaft 24 (FIG. 1), e.g., by a respective rotor wheel 116 that couples them circumferentially to shaft 24 (FIG. 1). That is, blades 114 are mechanically coupled in a circumferentially spaced manner to shaft 24, e.g., by rotor wheels 116. A static nozzle section 115 includes a plurality of stationary nozzles 112 mounted to a casing 124 and circumferentially spaced around shaft 24 (FIG. 1). It is recognized that blades 114 rotate with shaft 24 (FIG. 1) and thus experience centrifugal force, while nozzles 112 are static.

Figure 3:
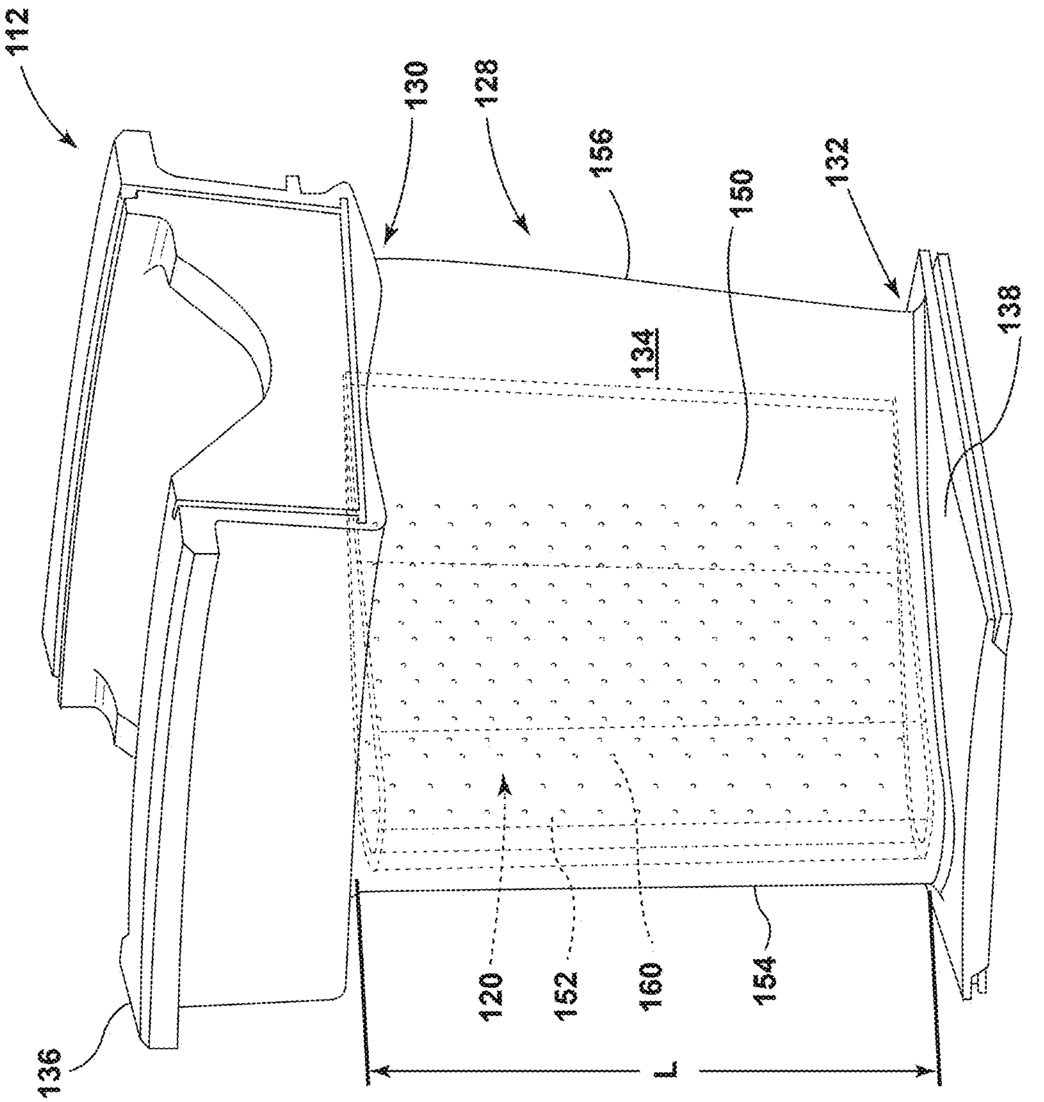
FIG. 3 illustrates a perspective view of a turbine nozzle including an impingement cooling structure in accordance with embodiments of the disclosure.
Figure 4:
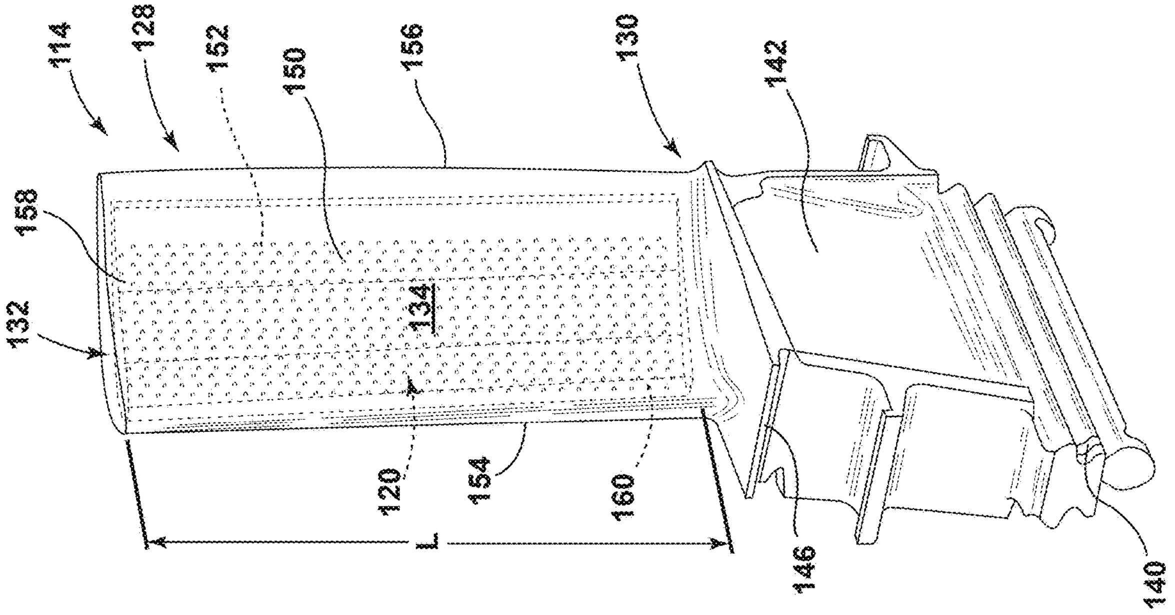
FIG. 4 illustrates a perspective view of a turbine rotor blade including an impingement cooling structure in accordance with embodiments of the disclosure.

Referring to FIGS. 3 and 4, perspective views, respectively, of a (stationary) nozzle 112 and a (rotating) blade 114 are illustrated in accordance with embodiments of the present disclosure. As shown, each nozzle 112 or blade 114 includes an airfoil 128 having a base end 130, a tip end 132, and an airfoil body 134 extending between base end 130 and tip end 132. As shown in FIG. 3, nozzle 112 includes an outer endwall 136 at base end 130 and an inner endwall 138 at tip end 132. Outer endwall 136 couples to casing 124 (FIG. 2). As shown in FIG. 4, blade 114 includes a dovetail 140 at base end 130 by which blade 114 attaches to a rotor wheel 116 (FIG. 2) of shaft 24 (FIG. 2). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine section 22.

It will be appreciated that airfoil body 134 in nozzle 112 and blade 114 is the active component of the nozzle 112 or blade 114 that intercepts the flow of working fluid and, in the case of blades 114, induces shaft 24 (FIG. 1) to rotate. It will be seen that airfoil body 134 of nozzle 112 and blade 114 includes a pressure side (PS) 150 (which may be concave) and a circumferentially or laterally opposite suction side (SS) 152 (which may be convex) extending axially between opposite leading and trailing edges 154, 156, respectively. Pressure side 150 and suction side 154 also extend in the radial direction from base end 130 (i.e., outer endwall 136 for nozzle 112 and platform 146 for blade 114) to tip end 132 (i.e., inner endwall 138 for nozzle 112 and a tip end 158 for blade 114). Pressure side 150 and suction side 154 form, therebetween, a radially extending chamber 160, e.g., for receiving a flow of a coolant. As shown in the partial cross-sectional view of FIG. 5, airfoil body 134 has an inner surface 162 facing radially extending chamber 160. Coolant may be provided to radially extending chamber 160 from any now known or later developed source, e.g., air from the compressor section 12.

Note, in the example shown, blade 114 does not include a tip shroud; however, teachings of the disclosure are equally applicable to a blade including a tip shroud at tip end 158. Nozzle 112 and blade 114 shown in FIGS. 3-4 are illustrative only, and the teachings of the disclosure can be applied to a wide variety of nozzles and blades.

Figure 5:
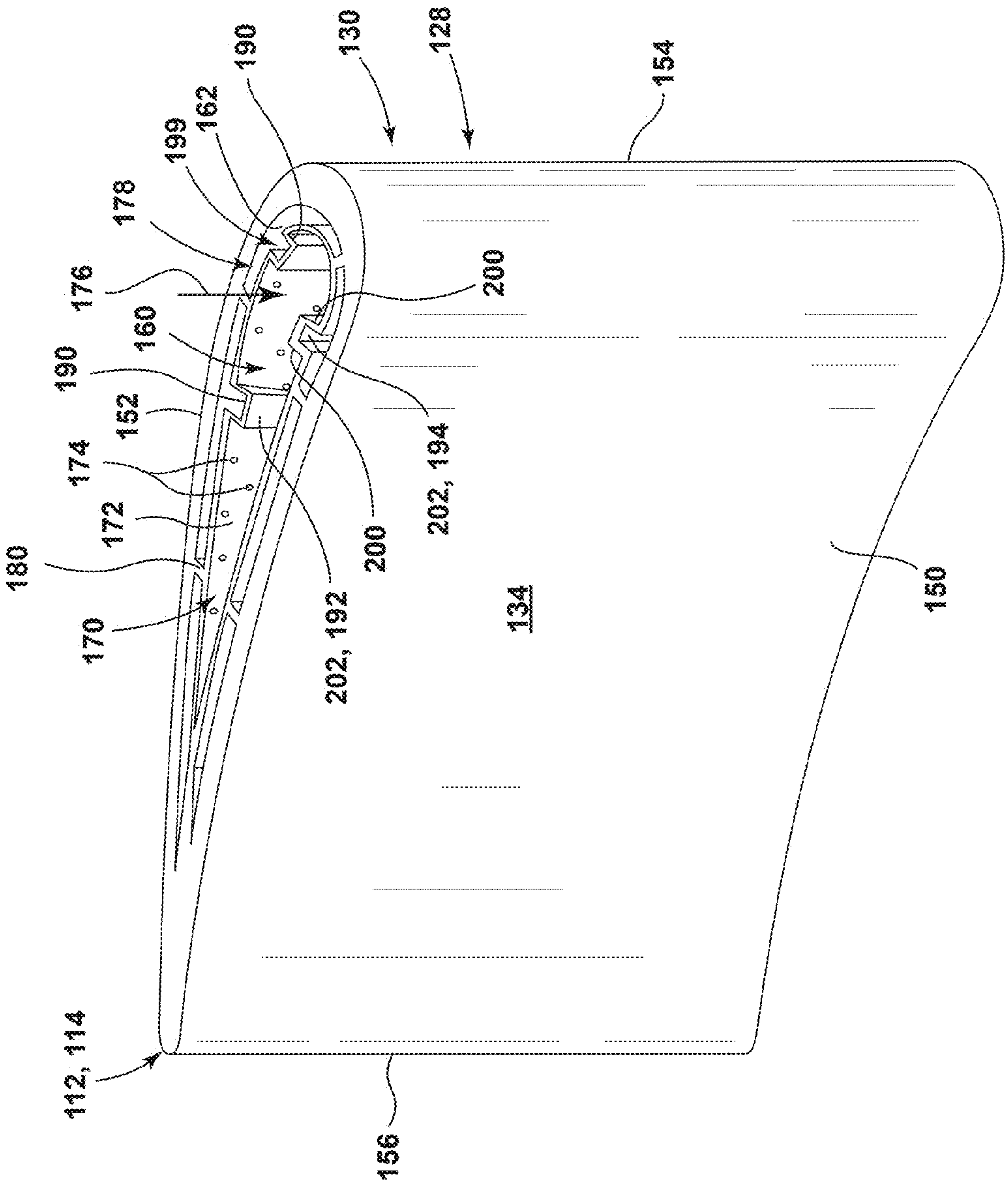
FIG. 5 shows a partial cross-sectional view of an airfoil in accordance with embodiments of the present disclosure.

As shown in FIG. 5, nozzle 112 or blade 114 also includes impingement cooling structure 170 positioned within the radially extending chamber 160. Impingement cooling structure 170 is a unitary, internal structure that is integrally formed with airfoil body 134. More particularly, airfoil body 134 and the impingement cooling structure 170 are formed together using additive manufacturing such that they include a plurality of integral material layers.

Impingement cooling structure 170 (hereafter "structure 170") includes an impingement wall 172 spaced from inner surface 162 of airfoil body 134. A plurality of apertures 174 are defined through impingement wall 172 such that a coolant supplied to radially extending chamber 160 can pass through apertures 174 to cool inner surface 162 of airfoil body 134. Impingement wall 172 is spaced from inner surface 162 of airfoil body 134 to define a post-impingement cavity 178 between impingement wall 172 and inner surface 162. Impingement wall 172 is a single wall structure, i.e., it is one piece. Further, impingement cooling structure 170 is integral with airfoil body 134 at respective first ends 184, 186 thereof. Impingement cooling structure 170 may also be integral with airfoil body 134 at respective radially inward second ends (not shown).

The spacing between impingement wall 172 of structure 170 and inner surface 162 of airfoil body 134 may be user defined to ensure the desired cooling. One or more support members 180 may be provided to space impingement wall 172 from inner surface 162 of airfoil body 134. Support members 180 can be, for example, structural posts capable of holding impingement wall 172 in a desired position. Support members 180 may be arranged in rows. In another example, support members 180 can each be a structural rib capable of holding impingement wall 172 in a desired position. In the illustrated embodiment of FIG. 5, support members 180 may be generally parallel to thermal flex elements 190.

Structure 170 also includes a plurality of elongated thermal flex elements 190 defined in the impingement wall 172. As shown in FIG. 5, the plurality of elongated thermal flex elements 190 (hereafter "flex elements 190") are not solid ribs or supports that extend from a surface of structure 170, but rather are hollow structures or curvatures in the normally planar or sheet-like surface of impingement wall 172. Flex elements 190 may be generally rectangularly shaped having side wall portions 200 that are spaced apart from one another and an end wall portion 202. The side wall portions 200 may extend generally perpendicularly from the impingement wall 172. The end wall portion 202 may extend between the side wall portions 200, and the end wall portion 202 may be oriented generally perpendicularly to both the side wall portions 200.

The end wall portion 202 may define opposing surfaces 192, 194. Surface 192 faces radially extending chamber 160, and surface 194 faces inner surface 162 of airfoil body 134. Opposing surfaces 192, 194 of flex elements 190 are generally parallel. That is, opposing surfaces 192, 194 are parallel to the extent possible using an appropriate additive manufacturing process and with some minor allowances for the desired rigidity and/or flexibility of flex elements 190 relative to the rest of impingement wall 172. Flex elements 190 extend, or protrude, inwardly towards radially extending chamber 160. As shown in FIG. 5, in some instances, support members 180 are located between flex elements 190. Flex elements 190 are referred to as 'elongated' because they have a generally linear extent about an interior of impingement wall 172 that is greater than their radial extent (relative to radial length of nozzle 112 or blade 114). Impingement cooling apertures 174 can be arranged in any manner between adjacent flex element(s) 190 to accommodate the desired cooling of inner surface 162 and the location of flex element(s) 190 and/or support members 180.

Flex elements 190 provide thermal compliance for the integrally formed airfoil body 134 and impingement cooling structure 170. More particularly, flex elements 190 greatly reduce the thermally induced strain on the components as they are exposed to large thermal differences between hot combustion gases and an impingement coolant (e.g., coolant 176). Hence, nozzle 112 or blade 114 can be built robustly for high cycle fatigue (HCF), yet flexibly for low cycle fatigue (LCF). Flex elements 190 also allow for cost effective additive manufacturing of turbine nozzle 112 or blade 114 regardless of the anticipated temperature gradients they will be exposed to during use. Flex elements 190 also allow maintenance of normal aperture 174 spacing, and prevent breaking of support members 180, despite increased temperature gradients.

As shown in FIG. 5, the airfoil body 134 may include the leading edge 154 and the trailing edge 156 spaced apart from one another. Additionally, the airfoil body 134 includes the suction side 154 and the pressure side 150 each extending between the leading edge 154 and the trailing edge 156.

Figure 7:
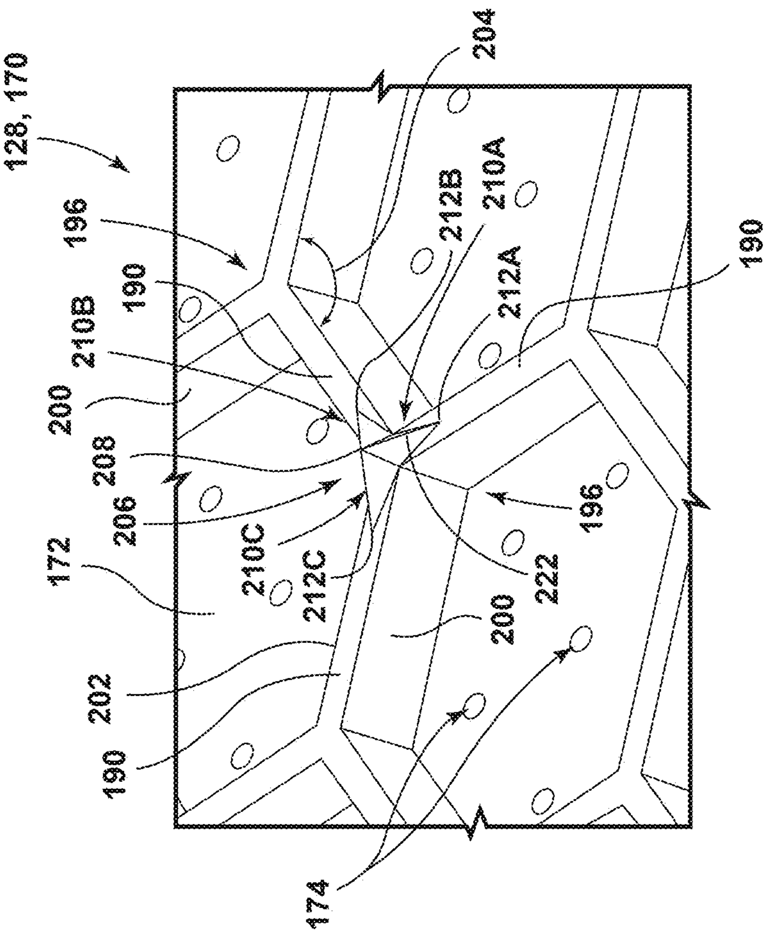
FIG. 7 is an enlarged perspective view of an impingement cooling structure of an airfoil in accordance with embodiments of the present disclosure.
Figure 6:
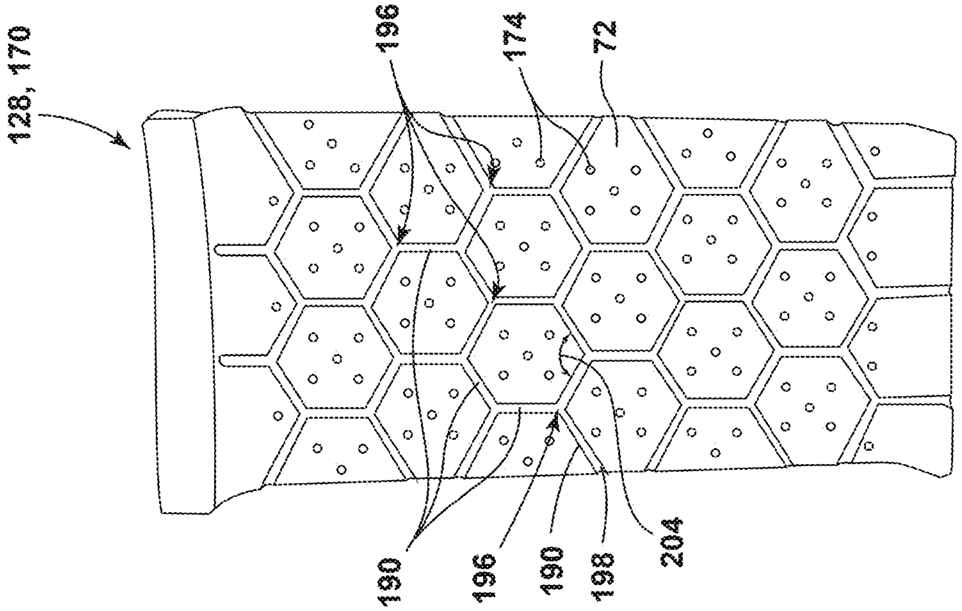
FIG. 6 illustrates a cross-sectional view of an airfoil showing an impingement cooling structure having the impingement wall and a plurality of flex elements in accordance with embodiments of the present disclosure.
Figure 9:
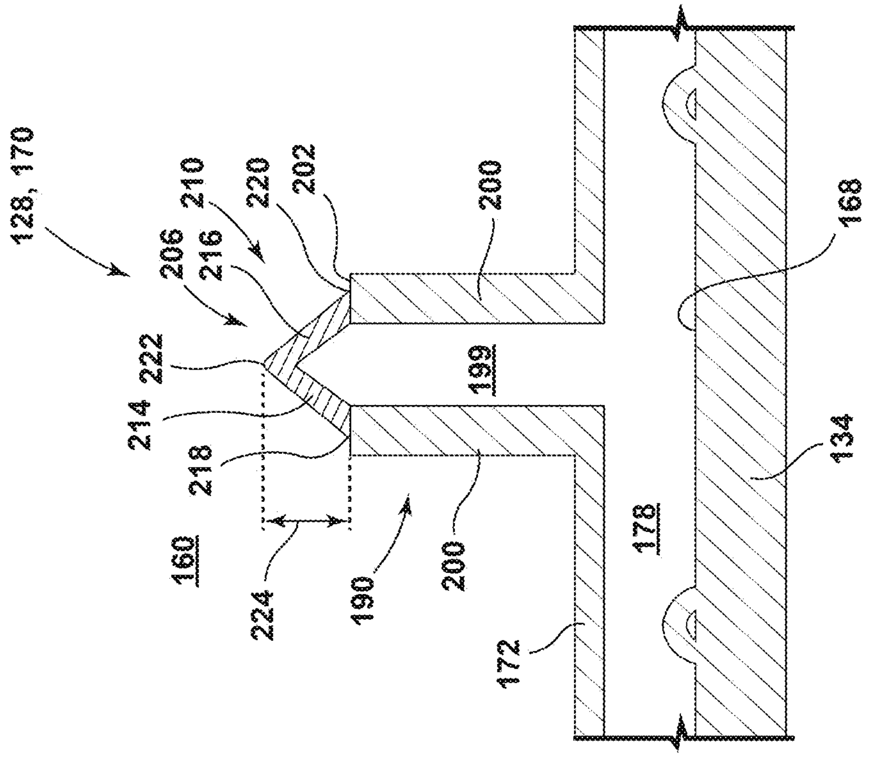
FIG. 9 illustrates a cross-sectional view of the impingement cooling structure shown in FIG. 8 from along the line 9-9 in accordance with embodiments of the present disclosure.
Figure 8:
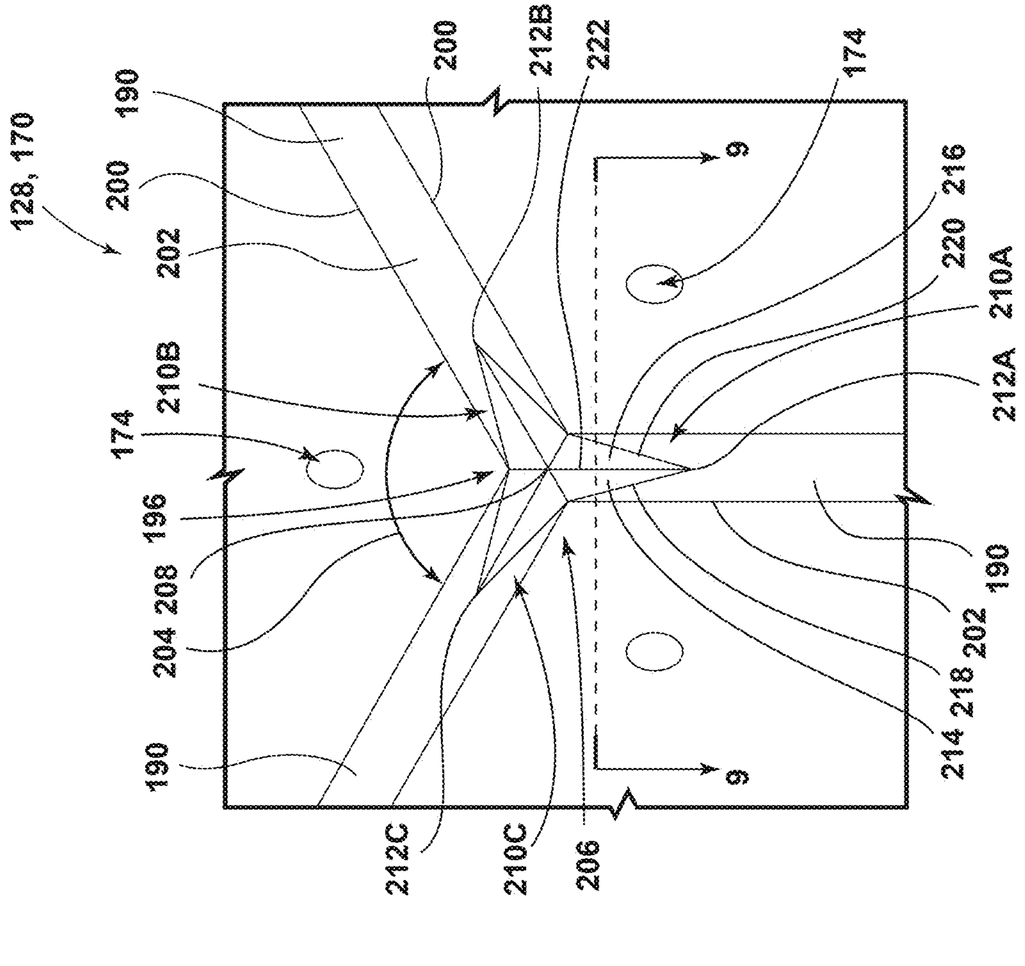
FIG. 8 illustrates a planar view of an impingement cooling structure of an airfoil in accordance with embodiments of the present disclosure.

Referring now to FIGS. 6-9, various views the airfoil 128 having the impingement cooling structure 170 are illustrated in accordance with embodiments of the present disclosure. Specifically, FIG. 6 illustrates a cross-sectional view of the airfoil 128 showing the impingement cooling structure 170 having the impingement wall 172 and the plurality of flex elements 190. FIG. 7 is an enlarged perspective view of the impingement cooling structure 170 of the airfoil 128. FIG. 8 illustrates a planar view of the impingement cooling structure 170 of the airfoil 128. FIG. 9 illustrates a cross-sectional view of the impingement cooling structure 170 from along the line 9-9 shown in FIG. 8 in accordance with embodiments of the present disclosure.

As shown, the impingement cooling structure 170 includes the impingement wall 172 spaced apart from the airfoil body 134 (FIG. 9) such that a post-impingement cavity 178 is defined between the impingement wall 172 and the airfoil body 134. Specifically, as shown in FIG. 9, the airfoil body 134 may define the inner surface 162, and the impingement wall 172 may be spaced apart from the inner surface 162. As shown in FIGS. 6-8, the impingement wall 172 may define a plurality of impingement cooling apertures 174 that are each sized and oriented to cause a cooling fluid (e.g., air from the compressor section) to impinge upon the inner surface 162 (FIG. 9) to cool the airfoil body 134.

That is, the impingement apertures 174 may be sized and oriented to direct the pre-impingement coolant (e.g., air) in discrete jets to impinge upon the inner surface 162. The discrete jets of coolant impinge (or strike) the inner surface 162 and create a thin boundary layer of coolant over the inner surface 162, which allows for optimal heat transfer between the airfoil body 134 and the coolant. For example, in some embodiments, the impingement apertures 174 may orient pre-impingement coolant such that it is perpendicular to the surface upon which it strikes, e.g. the inner surface 162. Once the coolant has impinged upon the inner surface 162, it may be referred to as "post-impingement coolant" and/or "spent coolant" because the coolant has undergone an energy transfer and therefore has different characteristics. For example, the spent coolant may have a higher temperature and lower pressure than the pre-impingement coolant because the spent coolant has removed heat from the airfoil body 134 during the impingement process.

The plurality of flex elements 190 may each extend from the impingement wall 172 towards the chamber 160 (FIG. 5). The plurality of flex elements 190 may each extend from the impingement wall 172 and may be arranged in a pattern.

For example, as shown, the plurality of flex elements 190 may be arranged in a polygonal pattern, such that the plurality of flex elements 190 join together to form a plurality of polygonal shapes. For example, in the embodiment shown, the plurality of flex elements 190 may be arranged in a hexagonal pattern, such that the plurality of flex elements 190 join together to form a plurality of hexagonal shapes.

Additionally, each of the flex elements 190 may be joined to one or more other flex element(s) 190 at a junction 196. That is, two or more flex elements 190 may be joined together at the junction 196. In the illustrated embodiment, the junctions 196 may be defined at an intersection of three flex elements 190. As shown in FIG. 6, each flex element 190 may extend generally linearly along the impingement plate 172 to a respective junction 196. Specifically, as shown in FIG. 6, many of the flex elements 190 (such as a majority of the flex elements 190) may extend linearly along the impingement wall 172 from a first junction 196 to a second junction 196. Additionally, as shown in FIG. 6, some of the flex elements 190 (such as a minority of the flex elements 190), may extend from an end 198 where the flex element 190 terminates to a junction 196 where the flex element 190 is joined to one or more other flex elements 190.

As shown in FIGS. 7-9, each flex element 190 of the plurality of flex elements 190 may be generally shaped as a rectangular prism. For example, each flex element 190 of the plurality of flex elements 190 may include side wall portions 200 that are spaced apart from one another and an end wall portion 202. The side wall portions 200 may extend generally perpendicularly from the impingement wall 172. The side wall portions 200 of each flex element 190 may be generally parallel to one another. The end wall portion 202 may extend between the side wall portions 200, and the end wall portion 202 may be oriented generally perpendicularly to both the side wall portions 200. The end wall portion 202 may be generally parallel to the impingement wall 172. The plurality of flex elements 190 are not solid ribs or supports that extend from a surface of structure 170, but rather are hollow structures or curvatures in the normally planar or sheet-like surface of impingement wall 172. For example, as shown best in FIG. 9, the flex elements 190 may define a channel 199 between the side walls 200 and the end wall 202. The channel 199 may be fluidly connected to the post-impingement cavity 178.

As described above, the two or more flex elements 190 may be joined together at the junction 196. In such embodiments, as shown in FIGS. 6-8, the two or more flex elements 190 form an angle 204 with one another at the junction 196. Specifically, the angle 204 may be defined between the sidewall 200 of a first flex element 190 and the sidewall 200 of a second flex element 190 joined to the first flex element 190 at the junction 196. The angle 204 may be oblique, such that the two flex elements 190 are not parallel nor perpendicular to one another. In various embodiments, the angle 204 may be between about 100° and about 140°, or such as between about 110° and about 130°, or such as about 120°.

In exemplary embodiments, the impingement cooling structure 170 may further include a compliance structure 206 positioned at the junction 196 and extending from the two or more flex elements 190. Specifically, in many embodiments, as shown, the compliance structure 206 may extend outwardly (towards the chamber 160) from the end walls 202 of the two or more flex elements 190. The compliance structure 206 may further define the channel 199, such that the channel 199 is collectively defined by the side walls 202, the end wall 202, and the compliance structure 206.

While in the illustrated embodiments the compliance structure 206 extends outwardly, in other embodiments (not shown), the compliance structure 206 may extend inwardly (towards the chamber airfoil body 134) from the end walls 202 of the two or more flex elements 190. In such embodiments, the compliance structure 206 may be positioned between the side walls 200.

In many embodiments, as shown in FIGS. 7 and 8, the compliance structure 206 may include an apex 208 that is centered on the junction 196. The apex 208 may be the outward most point of the compliance structure 206 (e.g., the farthest point from the end wall 202 from which the compliance structure 206 extends). The compliance structure 206 may further include one or more legs 210A, 210B, 210C each extending from the apex 208, along a respective flex element 190, to a respective tip 212A, 212B, 212C. For example, in the illustrated embodiments, the compliance structure 206 may include a first leg 210A, a second leg 210B, and a third leg 210C. The first leg 210A extends from the apex 208, along a first flex element 190, to a first tip 212A. The second leg 210B extends from the apex 208, along a second flex element 190, to a second tip 212B. The third leg 210C extends from the apex 208, along a third flex element 190, to a third tip 212C.

In exemplary embodiments, as shown in FIGS. 8 and 9, each leg of the one or more legs 210A, 210B, 210C includes a first wall 214 and a second wall 216 that each extend from a respective base 218, 220 connected to a flex element 190 of the plurality of flex elements 190 to a common edge 222. That is, the first wall 214 and the second wall 216 of each leg 210A, 210B, 210C may be joined to one another at the common edge 222.

As shown in FIG. 9, the first wall 214 and the second wall 216 may be angled relative to the side walls 200 of the flex rib 219. More specifically, the first wall 214 and the second wall 216 may converge towards one another as the first wall 214 and the second wall 216 extend from the respective base 218, 220 to the common edge 222. For example, the first wall 214 and the second wall 216 may be slanted or otherwise sloped towards one another with respect to the side walls 200, such that the first wall 214 and the second wall 216 are spaced apart at the respective base 218, 220 and meet or intersect at the common edge 222.

Additionally, as shown in FIG. 8, the first wall 214 and the second wall 216 of each leg may converge towards one another as the first wall 214 and the second wall 216 extend from the apex 208 to the tip 212. For example, the first wall 214 and the second wall 216 may be slanted or otherwise sloped towards one another, such that the first wall 214 and the second wall 216 meet or intersect at the tip 212A. That is, as the walls 214, 216 extend along the flex element 190 from the apex 208 towards the tip 212A, the walls 214, 216 may converge towards one another until the walls 214, 216 intersect at the tip 212A.

As shown in FIG. 9, each leg 210 of the one or more legs 210 defines a height 224. As shown in FIG. 7, the height 224 may tapers as the respective leg 210A, 210B, 210C extends from the apex 208 to the respective tip 212A, 212B, 212C. For example, the height 224 may be defined between an outer surface of the end wall 202 and the common edge 222, and the height 224 may converge or decrease as the respective leg 210A, 210B, 210C extends from the apex 208 to the respective tip 212A, 212B, 212C. The height 224 of each leg 210A, 210B, 210C may linearly (and continuously) taper from the apex 208 to the respective tip 212A, 212B, 212C.

In many embodiments, the airfoil 128 described herein may be integrally formed as a single component. That is, each of the subcomponents, e.g., the airfoil body 134 and the impingement cooling structure 170, and any other subcomponent of the airfoil 128, may be manufactured together as a single body. In exemplary embodiments, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In this regard, by utilizing additive manufacturing methods, the [insert component] may be integrally formed as a single piece of continuous metal and may thus include fewer sub-components and/or joints compared to prior designs. The integral formation of the airfoil 128 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

As should be appreciated, the compliance structure 206 described herein advantageously improves strain relief and reduces LCF at the junctions 196 of the flex elements 190. This prolongs the life of the airfoil 128 and allows for operation at higher temperatures for longer durations than would otherwise be possible. Additionally, the compliance structure 206 is capable of being additively manufactured with the airfoil 128, which reduces manufacturing costs and considerations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

An airfoil comprising: an airfoil body having a leading edge, a trailing edge, a suction side extending between the leading edge and the trailing edge, and a pressure side extending between the leading edge and the trailing edge, the airfoil body defining a chamber; an impingement cooling structure positioned within the chamber, the impingement cooling structure including: an impingement wall spaced apart from the airfoil body such that a post-impingement cavity is defined between the impingement wall and the airfoil body; a plurality of flex elements extending from the impingement wall, wherein two or more flex elements are joined together at a junction; and a compliance structure is positioned at the junction and extending from to the two or more flex elements.

The airfoil as in any preceding clause, wherein the two or more flex elements form an angle with one another at the junction.

The airfoil as in any preceding clause, wherein the plurality of flex elements extend from the impingement wall and are arranged in a pattern.

The airfoil as in any preceding clause, wherein the airfoil is integrally formed.

The airfoil as in any preceding clause, wherein at least one flex element of the plurality of flex elements include side walls spaced apart from one another and extending generally perpendicularly from the impingement wall and an end wall extending generally perpendicularly between the side walls, and wherein the compliance structure extends from the end wall.

The airfoil as in any preceding clause, wherein the compliance structure includes an apex that is centered on the junction and one or more legs each extending from the apex along a respective flex element of the two or more flex elements to a tip.

The airfoil as in any preceding clause, wherein each leg of the one or more legs defines a height that tapers as the respective leg extends from the apex to the tip.

The airfoil as in any preceding clause, wherein each leg of the one or more legs includes a first wall and a second wall that each extend from a respective base connected to a flex element the plurality of flex elements to a common edge.

The airfoil as in any preceding clause, wherein the first wall and the second wall converge towards one another as the first wall and the second wall extend from the respective base to the common edge.

The airfoil as in any preceding clause, wherein the first wall and the second wall converge towards one another as the first wall and the second wall extend from the apex to the tip.

A turbine section of a gas turbine, the turbine section comprising: rotor blades; and stationary nozzles, wherein one of the rotor blades or the stationary nozzles includes an airfoil, the airfoil comprising: an airfoil body having a leading edge, a trailing edge, a suction side extending between the leading edge and the trailing edge, and a pressure side extending between the leading edge and the trailing edge, the airfoil body defining a chamber; an impingement cooling structure positioned within the chamber, the impingement cooling structure including: an impingement wall spaced apart from the airfoil body such that a post-impingement cavity is defined between the impingement wall and the airfoil body; a plurality of flex elements extending from the impingement wall, wherein two or more flex elements are joined together at a junction; and a compliance structure is positioned at the junction and extending from to the two or more flex elements.

The turbine section as in any preceding clause, wherein the two or more flex elements form an angle with one another at the junction.

The turbine section as in any preceding clause, wherein the plurality of flex elements extend from the impingement wall and are arranged in a pattern.

The turbine section as in any preceding clause, wherein the airfoil is integrally formed.

The turbine section as in any preceding clause, wherein at least one flex element of the plurality of flex elements include side walls spaced apart from one another and extending generally perpendicularly from the impingement wall and an end wall extending generally perpendicularly between the side walls, and wherein the compliance structure extends from the end wall.

The turbine section as in any preceding clause, wherein the compliance structure includes an apex that is centered on the junction and one or more legs each extending from the apex along a respective flex element of the two or more flex elements to a tip.

The turbine section as in any preceding clause, wherein each leg of the one or more legs defines a height that tapers as the respective leg extends from the apex to the tip.

The turbine section as in any preceding clause, wherein each leg of the one or more legs includes a first wall and a second wall that each extend from a respective base connected to a flex element the plurality of flex elements to a common edge.

The turbine section as in any preceding clause, wherein the first wall and the second wall converge towards one another as the first wall and the second wall extend from the respective base to the common edge.

The turbine section as in any preceding clause, wherein the first wall and the second wall converge towards one another as the first wall and the second wall extend from the apex to the tip.

What is claimed is:

1. An airfoil comprising:

an airfoil body having a leading edge, a trailing edge, a suction side extending between the leading edge and the trailing edge, and a pressure side extending between the leading edge and the trailing edge, the airfoil body defining a chamber;

an impingement cooling structure positioned within the chamber, the impingement cooling structure including:

an impingement wall spaced apart from the airfoil body such that a post-impingement cavity is defined between the impingement wall and the airfoil body;

a plurality of flex elements extending from the impingement wall, wherein two or more flex elements are joined together at a junction; and a compliance structure is positioned at the junction and extending from to the two or more flex elements, wherein the compliance structure includes an apex and one or more legs that extend from the apex, and wherein at least one leg of the one or more legs includes a first wall and a second wall that each extend from a respective base connected to flex element of the plurality of flex elements to a common edge.

2. The airfoil as in claim 1, wherein the two or more flex elements form an angle with one another at the junction.

3. The airfoil as in claim 1, wherein the plurality of flex elements extend from the impingement wall and are arranged in a pattern.

4. The airfoil as in claim 1, wherein the airfoil is integrally formed.

5. The airfoil as in claim 1, wherein at least one flex element of the plurality of flex elements include side walls spaced apart from one another and extending generally perpendicularly from the impingement wall and an end wall extending generally perpendicularly between the side walls, and wherein the compliance structure extends from the end wall.

6. The airfoil as in claim 1, wherein the apex is centered on the junction and the one or more legs each extend from the apex along a respective flex element of the two or more flex elements to a tip.

7. The airfoil as in claim 6, wherein each leg of the one or more legs defines a height that tapers as the respective leg extends from the apex to the tip.

8. The airfoil as in claim 1, wherein the first wall and the second wall converge towards one another as the first wall and the second wall extend from the respective base to the common edge.

9. The airfoil as in claim 6, wherein the first wall and the second wall converge towards one another as the first wall and the second wall extend from the apex to the tip.

10. A turbine section of a gas turbine, the turbine section comprising:

rotor blades; and stationary nozzles, wherein one of the rotor blades or the stationary nozzles includes an airfoil, the airfoil comprising:

an airfoil body having a leading edge, a trailing edge, a suction side extending between the leading edge and the trailing edge, and a pressure side extending between the leading edge and the trailing edge, the airfoil body defining a chamber;

an impingement cooling structure positioned within the chamber, the impingement cooling structure including:

an impingement wall spaced apart from the airfoil body such that a post-impingement cavity is defined between the impingement wall and the airfoil body;

a plurality of flex elements extending from the impingement wall, wherein two or more flex elements are joined together at a junction; and a compliance structure is positioned at the junction and extending from to the two or more flex elements, wherein the compliance structure includes an apex and one or more legs that extend from the apex, and wherein at least one leg of the one or more legs includes a first wall and a second wall that each extend from a respective base connected to flex element of the plurality of flex elements to a common edge.

11. The turbine section as in claim 10, wherein the two or more flex elements form an angle with one another at the junction.

12. The turbine section as in claim 10, wherein the plurality of flex elements extend from the impingement wall and are arranged in a pattern.

13. The turbine section as in claim 10, wherein the airfoil is integrally formed.

14. The turbine section as in claim 10, wherein at least one flex element of the plurality of flex elements include side walls spaced apart from one another and extending generally perpendicularly from the impingement wall and an end wall extending generally perpendicularly between the side walls, and wherein the compliance structure extends from the end wall.

15. The turbine section as in claim 10, wherein the apex is centered on the junction and the one or more legs each extend from the apex along a respective flex element of the two or more flex elements to a tip.

16. The turbine section as in claim 15, wherein each leg of the one or more legs defines a height that tapers as the respective leg extends from the apex to the tip.

17. The turbine section as in claim 10, wherein the first wall and the second wall converge towards one another as the first wall and the second wall extend from the respective base to the common edge.

18. The turbine section as in claim 15, wherein the first wall and the second wall converge towards one another as the first wall and the second wall extend from the apex to the tip.

19. An airfoil comprising:

an airfoil body having a leading edge, a trailing edge, a suction side extending between the leading edge and the trailing edge, and a pressure side extending between the leading edge and the trailing edge, the airfoil body defining a chamber;

an impingement cooling structure positioned within the chamber, the impingement cooling structure including:

an impingement wall spaced apart from the airfoil body such that a post-impingement cavity is defined between the impingement wall and the airfoil body;

a plurality of flex elements extending from the impingement wall, wherein two or more flex elements are joined together at a junction; and a compliance structure is positioned at the junction and extending from to the two or more flex elements, wherein the compliance structure includes an apex that is centered on the junction and one or more legs each extending from the apex along a respective flex element of the two or more flex elements to a tip, and wherein each leg of the one or more legs includes a first wall and a second wall that each extend from a respective base connected to a flex element of the plurality of flex elements to a common edge.

* * * * *